(12) United States Patent
Mitsuhashi

(10) Patent No.: US 6,320,667 B1
(45) Date of Patent: *Nov. 20, 2001

(54) INFORMATION PROCESSING APPARATUS AND METHOD FOR TRANSMITTING PRINTING INFORMATION, AND RECORDING MEDIUM READABLE BY A COMPUTER STORING A PROGRAM FOR TRANSMITTING PRINTING INFORMATION

(75) Inventor: Shunya Mitsuhashi, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,334

(22) Filed: Dec. 24, 1997

(30) Foreign Application Priority Data

Dec. 27, 1996 (JP) ...................................................... 8-351008

(51) Int. Cl.[7] ........................................................ B41B 1/00
(52) U.S. Cl. ............................................. 358/1.1; 358/1.16
(58) Field of Search ..................................... 395/111, 117; 358/1.15, 1.16, 1.12, 1.18, 1.1

(56) References Cited

U.S. PATENT DOCUMENTS

| | | | | |
|---|---|---|---|---|
| 5,216,754 | * | 6/1993 | Sathi et al. | 395/113 |
| 5,469,533 | * | 11/1995 | Dennis | 395/114 |
| 5,471,563 | * | 11/1995 | Dennis et al. | 358/1.15 |
| 5,528,734 | * | 6/1996 | Sanchez | 395/115 |
| 5,608,848 | * | 3/1997 | Walker | 385/116 |
| 5,642,474 | * | 6/1997 | Parkhurst et al. | 395/117 |
| 5,644,682 | * | 7/1997 | Weinberger et al. | 395/101 |
| 5,675,719 | * | 10/1997 | Matias et al. | 358/1.16 |
| 5,729,665 | * | 3/1998 | Gauthier | 395/117 |
| 5,754,750 | * | 5/1998 | Butterfield et al. | 345/418 |
| 5,793,937 | * | 8/1998 | Chura et al. | 358/1.16 |
| 5,809,218 | * | 9/1998 | Kastenholz et al. | 395/115 |
| 5,859,954 | * | 1/1999 | Toda | 395/102 |
| 5,913,099 | * | 6/1999 | Kamei et al. | 399/296 |

* cited by examiner

*Primary Examiner*—Yon J. Couso
(74) *Attorney, Agent, or Firm*—Fitzpatrick, Cella, Harper & Scinto

(57) ABSTRACT

Output control information generated by an application program is converted to output information and stored in a printer spooler for analysis by an external apparatus. The stored output information is re-converted by an adaptive printing processor and sent to a printing apparatus for printing.

39 Claims, 12 Drawing Sheets

| FIG. 2A | FIG. 2B |

INTERMEDIATE-DATA FORMAT

FIG. 10

RECORDING MEDIUM SUCH AS FLOPPY DISK OR CD-ROM

| DIRECTORY INFORMATION |
|---|
| FIRST DATA PROCESSING PROGRAM PROGRAM CODE GROUP CORRESPONDING TO FLOWCHART STEPS SHOWN IN FIG. 5 |
| SECOND DATA PROCESSING PROGRAM PROGRAM CODE GROUP CORRESPONDING TO FLOWCHART STEPS SHOWN IN FIG. 6 |
| |

MEMORY MAP OF RECORDING MEDIUM

```
   I {-24} {0} {0} {rs} { } ------------ SPECIFY FILL-IN PATTERN
 } : {50} {80} {100} {130} {rs} { } ----- DRAW RECTANGLE
   I {-24} {0} {0} {rs} { } ------------ SPECIFY FILL-IN PATTERN
 } : {80} {110} {100} {130} {rs} { } ---- DRAW RECTANGLE
   I {-24} {0} {0} {rs} { } ------------ SPECIFY FILL-IN PATTERN
 } : {110} {140} {100} {130} {rs} { } --- DRAW RECTANGLE
```

```
   I {-24} {0} {0} {rs} { } ------------ SPECIFY FILL-IN PATTERN
 } : {50} {140} {100} {130} {rs} { } ---- DRAW RECTANGLE
```

INFORMATION PROCESSING APPARATUS AND METHOD FOR TRANSMITTING PRINTING INFORMATION, AND RECORDING MEDIUM READABLE BY A COMPUTER STORING A PROGRAM FOR TRANSMITTING PRINTING INFORMATION

BACKGROUND OF THE INVENTION

1. Field of the Invention

The present invention relates to an information processing apparatus in which specific output control information is converted to output information and the generated output information is sent to an external apparatus, an information processing method in which specific output control information is converted to output information and the generated output information is sent to an external apparatus, and a recording medium storing a program which can be read by a computer and in which specific output control information is converted to output information and the generated output information is sent to an external apparatus.

2. Description of the Related Art

Information processing systems including a printer which operates according to printing information sent from a host computer have been proposed. Various printing systems have also been proposed utilizing a printer with a printer control function. The printer control function includes a printer description language (PDL) and printer control commands. Software for the printer such as a printer driver stored in the host computer, a printer spooler, and a print processor are also included.

In a conventional printing system, processing in a printer driver is highly dependent on application software and an operating system (OS), which is basic software, such as Windows (a trademark of Microsoft Corporation) and UNIX. The main job of the printer driver is basically to convert printing information sent from the system to PDL codes of the target printer.

In the printer driver (for Windows 3.1) corresponding to a laser-beam printer called LBP-404F manufactured by Canon Inc., a user specifies the size of an extended memory mounted on the printer at the menu (graphic user interface) to switch the output mode between a standard mode (processing at a resolution of 300 dpi) and a high-resolution mode (processing at a resolution of 600 dpi).

A user's decision determines actual switching. The printer driver neither automatically specifies the most suited setting nor sends the most suited PDL code, with the load of the printer being taken into consideration. The load is determined according to information obtained by asking the printer about its memory capacity. The printer driver does not perform these kinds of printing-data processing.

In addition, the printer driver does not perform processing for reviewing the converted codes in PDL of the target printer and for re-converting them to other PDL codes so as to reduce the amount of codes to be transmitted to the printer or to reduce the time required for printing, with the same drawing result being obtained.

Windows NT and Windows 95 (trademarks of Microsoft Corporation) are provided with processes called a printer spooler and a printer processor. These processes are dedicated to storing printing information data, created by the printer driver or a system (GDI), in storage means and to send the stored printing information data to the printer.

A PDL code string created by the printer driver is conventionally sent to the printer with information not processed by the printer spooler or the printer processor. Whether a document is sequentially printed from page 1 or from the last page in the reverse order may be determined. In this case, the printer driver basically controls the printing order.

In some printing data processing, even when reverse-order printing is specified, the printer driver forms printing data from page 1 in the same way as in standard printing, printing data for all pages are stored in the printer spooler, and the printer processor controls the order of data transmission in units of pages when it sends the data to the printer.

In this case, the order of data transmission is just changed in units of pages. PDL codes themselves created by the printer driver are not processed or converted.

In many cases, the printer driver routinely converts printing information into PDL codes in a one-to-one correspondence manner. Processing is not changed according to the contents of data sent from the system and buffered. This may be caused by a restriction in the system in which the printer driver, one of processes, is not allowed to use the file system.

The above conventional printing system has the following problems.

Printer control codes sent to the printer greatly differ according to a drawing sequence and a drawing process the application software uses. As a result, the codes may include many redundant code strings such as those for repeating simple drawing instructions, or may significantly reduce performance to obtain a printing result.

As shown in FIG. 11A, for example, an object is divided into very small units to perform a drawing (in this case, a rectangle drawing). This can be collectively performed as shown in FIG. 11B. Code strings described in FIGS. 11A and 11B are based on a PDL called LIPS created by Canon Inc. The printer driver does not intentionally draw three divided rectangles in FIG. 11A, but the object is divided in the printing process of an application software and a drawing process.

To collect these divided rectangles in processing of the printer driver, it is to some extent necessary to pre-read printing information sent from the system. It is, however, very difficult to pre-read when processing the printer driver, and in some cases, it is impossible due to a restriction in the system.

Generally, the printer driver plays a role in converting drawing instructions and page control instructions, which are standardized in the system and sent from the basic software (OS), into printer control instructions which each printer has, such as those in a PDL. These instructions are created by application software (such as word-processing and spreadsheet software) running under the basic software. Therefore, many redundant printer control instructions are caused by a drawing process or a printing process in the application software.

It is currently difficult, however, to make a drawing process and a printing process dedicated to a certain printer in an application software in terms of technical reasons and other various points. In addition, in many cases software manufacturers are not willing to develop such application software. They believe a correct output is sufficient, and they are not inclined to reduce the time required for printing and to improve image quality.

On the other hand, the printer driver also has a similar problem. Even when it includes a process dedicated to specific application software, since the software is frequently upgraded, the process does not fit the software of a new version.

It is difficult to solve problems in some systems because the printer driver cannot determine which application software sends data to the driver or, conversely, the application software cannot determine which printer is currently connected.

In a network environment, since a plurality of users share one printer with a plurality of the host computers, it is required that problems be solved at the printer server rather than at each host computer having the printer driver.

SUMMARY OF THE INVENTION

Accordingly, it is an object of the present invention to provide an information processing apparatus in which the most suited output information which can be analyzed by an external apparatus is created from output control information generated by an application program and is sent, an information processing method in which the most suited output information which can be analyzed by an external apparatus is created from output control information generated by an application program and is sent, and a recording medium storing a program which can be read by a computer and in which the most suited output information which can be analyzed by an external apparatus is created from output control information generated by an application program and is sent. In other words, the object of the present invention is to provide an information processing apparatus in which output control information sent from an application program is converted to output information and re-converted so as to reduce the load of data processing in an external apparatus, and the information is transmitted, an information processing method in which output control information sent from an application program is converted to output information and re-converted so as to reduce the load of data processing in an external apparatus, and the information is transmitted, and a recording medium storing a program which can be read by a computer and in which output control information sent from an application program is converted to output information and re-converted so as to reduce the load of data processing in an external apparatus. To be more precise, the object of the present invention is to provide an information processing apparatus in which printing data sent from a printer driver is re-processed such that the data is suited to the output environmental condition of a printer and is transmitted to the printer, an information processing method in which printing data sent from a printer driver is re-processed such that the data is suited to the output environmental condition of a printer and is transmitted to the printer, and a recording medium storing a program which can be read by a computer and in which printing data sent from a printer driver is re-processed such that the data is suited to the output environmental condition of a printer and is transmitted to the printer.

The above object of the present invention is achieved in one aspect of the present invention through the provision of an information processing apparatus for converting certain output control information to output information and for transmitting the generated output information to an external apparatus including: storage means for storing the output information converted from the output control information; re-converting means for re-converting the output information stored in the storage means; and transmitting means for transmitting the output information converted by the re-converting means to an external apparatus. Therefore, the output information which is difficult to process by the external apparatus when it is converted from the output control information is re-converted to another output information to be easily processed by the external apparatus, and processing efficiency in the external apparatus which processes the transmitted output information is greatly improved.

In the information processing apparatus, the output control information may be generated through the execution of an application program in the information processing apparatus. In this case, the output information to be transmitted to the external apparatus is generated when the application program is executed.

The information processing apparatus may be configured such that the external apparatus is a printing apparatus and the output information re-converted by the re-converting means is printing data which can be analyzed by the external apparatus. In this case, the printing data can be easily analyzed according to an analyzing resource already provided for the external apparatus.

In the information processing apparatus, the output information converted from the output control information may be data which can be analyzed by the external apparatus. In this case, the printing data can be easily analyzed according to an analyzing resource already provided for the external apparatus.

In the information processing apparatus, the re-converting means may form the output information according to a page description language. In this case, the amount of output information data to be transmitted to the external apparatus is reduced.

The information processing apparatus may be configured such that the storage means stores the output information converted from each of sequentially generated output control information by a different conversion method, and the re-converting means re-converts each output information stored in the storage means in a unified data format. In this case, even output information converted by a different conversion method is converted to the most suited data format which the external apparatus can process in the same way.

In the information processing apparatus, when each of sequentially generated output information specifies a different sheet-feed direction, the re-converting means may re-convert each output information so as to specify the same sheet-feed direction. In this case, the load for data processing is reduced in the external apparatus which processes the output information.

The information processing apparatus may be configured such that it further includes recognition means for recognizing the state of the external apparatus, and the re-converting means re-converts the output information according to the state of the external apparatus recognized by the recognition means. In this case, the load for data processing is reduced in the external apparatus which processes the output information.

In the information processing apparatus, the re-converting means may re-convert, in units of a certain number of scanning lines, the output information converted from certain output control information in units of scanning lines. In this case, the output information can flexibly respond to the data processing unit in the application software.

In the information processing apparatus, the re-converting means may add additional information to output information formed in units of scanning lines to re-convert in units of the certain number of scanning lines. In this case, the output information to be transmitted to the external apparatus is made compact and is efficiently transmitted.

The above object of the present invention is also achieved in another aspect of the present invention through the provision of an information processing method for converting certain output control information to output information and for transmitting the generated output information to an external apparatus including the steps of: re-converting the output information converted from the output control information; and transmitting the re-converted output information to the external apparatus. Therefore, the output information which is difficult to handle by the external apparatus when it is converted from the output control information is re-converted to another output information to be easily processed by the external apparatus, and processing efficiency in the external apparatus which processes the transmitted output information is greatly improved.

In the information processing method, the output control information may be generated through the execution of an application program in the information processing apparatus. In this case, the output information to be transmitted to the external apparatus is generated when the application program is executed.

The information processing method may be configured such that the external apparatus is a printing apparatus and the output information re-converted by the re-converting step is printing data which can be analyzed by the external apparatus. In this case, the printing data can be easily analyzed according to an analyzing resource already provided for the external apparatus.

In the information processing method, the output information converted from the output control information may be data which can be analyzed by the external apparatus. In this case, the printing data can be easily analyzed according to an analyzing resource already provided for the external apparatus.

In the information processing method, the re-converting step may form the output information according to a page description language. In this case, the amount of output information data to be transmitted to the external apparatus is suppressed.

In the information processing method, the re-converting step may re-convert in a unified data format each of the output information converted from sequentially generated output control information by a different conversion method. In this case, even output information converted in a different conversion method is converted to the most suited data format which the external apparatus can process in the same way.

In the information processing method, when each of sequentially generated output information specifies a different sheet-feed direction, the re-converting step may re-convert each output information so as to specify the same sheet-feed direction. In this case, the load for data processing in the external apparatus which handles the output information is reduced.

The information processing method may be configured such that it further includes a recognition step for recognizing the state of the external apparatus and the re-converting step re-converts the output information according to the state of the external apparatus recognized by the recognition step. In this case, the load for data processing in the external apparatus which processes the output information is reduced.

In the information processing method, the re-converting step may re-convert in units of the certain number of scanning lines the output information converted from certain output control information in units of scanning lines. In this case, the output information can flexibly respond to the data processing unit in the application software.

In the information processing step, the re-converting step may add additional information to output information formed in units of scanning lines to re-convert in units of the certain number of scanning lines. In this case, the output information to be transmitted to the external apparatus is made compact and is efficiently transmitted.

The above object of the present invention is achieved in still another aspect of the present invention through the provision of a recording medium in which a program is stored which can be read by a computer, the program for converting certain output control information to output information and for transmitting the generated output information to an external apparatus including the steps of: re-converting the output information converted from the output control information; and transmitting the re-converted output information to the external apparatus. Therefore, the output information which is difficult to process by the external apparatus when it is converted from the output control information is re-converted to another output information to be easily processed by the external apparatus, and processing efficiency in the external apparatus which processes the transmitted output information is greatly improved.

In the recording medium in which the program is stored which can be read by a computer, the output control information may be generated through the execution of an application program in the information processing apparatus. In this case, the output information to be transmitted to the external apparatus is generated when the application program is executed.

In the recording medium in which the program is stored which can be read by a computer, the program may be configured such that the external apparatus is a printing apparatus and the output information re-converted by the re-converting step is printing data which can be analyzed by the external apparatus. In this case, the printing data can easily be analyzed according to an analyzing resource already provided for the external apparatus.

In the recording medium in which the program is stored which can be read by a computer, the output information converted from the output control information may be data which can be analyzed by the external apparatus. In this case, the printing data can easily be analyzed according to an analyzing resource already provided for the external apparatus.

In the recording medium in which the program is stored which can be read by a computer, the re-converting step may form the output information according to a page description language. In this case, the amount of output information data to be transmitted to the external apparatus is suppressed.

In the recording medium in which the program is stored which can be read by a computer, the re-converting step may re-convert in a unified data format each of the output information converted from sequentially generated output control information by a different conversion method. In this case, even output information converted in a different conversion method is converted in the most suited data format which the external apparatus can process in the same way.

In the recording medium in which the program is stored which can be read by a computer, when each of sequentially generated output information specifies a different sheet-feed direction, the re-converting step may re-convert each output information so as to specify the same sheet-feed direction. In this case, a load for data processing in the external apparatus which handles the output information is reduced.

In the recording medium in which the program is stored which can be read by a computer, the program may be configured such that it further includes a recognition step for recognizing the state of the external apparatus, and the re-converting step re-converts the output information according to the state of the external apparatus recognized by the recognition step. In this case, the load for data processing in the external apparatus which processes the output information is reduced.

In the recording medium in which a program is stored which can be read by a computer, the re-converting step may re-convert in units of the certain number of scanning lines the output information converted from certain output control information in units of scanning lines. In this case, the output information can flexibly respond to the data processing unit in the application software.

In the recording medium in which a program is stored which can be read by a computer, the re-converting step may add additional information to output information formed in units of scanning lines to re-convert in units of the certain number of scanning lines. In this case, the output information to be transmitted to the external apparatus is made compact and is efficiently transmitted.

As described above, the most suited output information which can be analyzed by the external apparatus is generated from output control information formed by an application program and is transmitted.

BRIEF DESCRIPTION OF THE DRAWINGS

FIG. 10 is a memory map of a recording medium in which various data processing programs are stored which can be read by a printing system to which an information processing apparatus according to the present invention can be applied.

DESCRIPTION OF THE PREFERRED EMBODIMENTS

Before embodiments of the present invention are described, a configuration of a laser-beam printer (hereinafter called an LBP) in a printing system to which the embodiments are applied is described by referring to FIG. 1.

Figure 1:
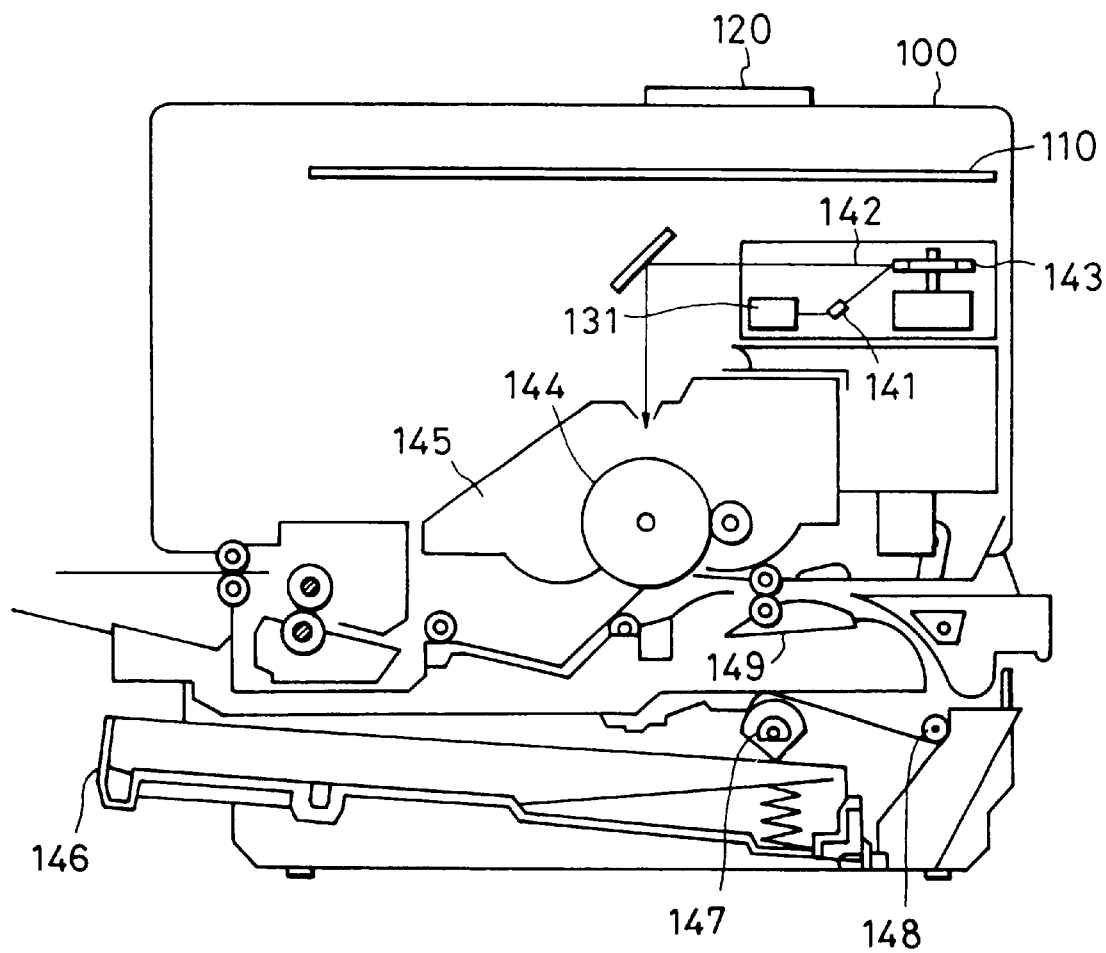
FIG. 1 is an outlined cross section of a printing apparatus which can communicate with an information processing apparatus according to the present invention.

FIG. 1 is an outlined cross section showing a configuration of a printing apparatus which communicates with an information processing apparatus according to the present invention. In FIG. 1, the printing apparatus is an LBP.

In FIG. 1, an LBP body 100 receives and stores macro instructions and printing information formed of printing data (including character codes) and control codes supplied from the host computer which is connected externally to the body. The LBP body 100 generates character patterns and form patterns corresponding to the information and forms an image on a recording sheet serving as a recording medium.

An operation panel 120 has an operational switch and an LED display. A formatter control section 110 performs control of the LBP body 100 and analysis of the character information sent from the host computer, for printing. Printing information developed in the formatter control section 110 is converted to the corresponding pattern video signal and output to a laser driver 131. The laser driver 131 drives a semiconductor laser 141 and switches on and off laser light 142 emitted from the semiconductor laser 141 according to an input video signal. The laser light 142 is reflected right and left by a rotating polygon mirror 143 to scan and expose an electrostatic drum 144. Then, an electrostatic latent image of a character pattern is formed on the electrostatic drum 144. This latent image is developed by a developing unit 145 disposed around the electrostatic drum 144 and is transferred to a recording sheet.

A cut sheet is used as the recording sheet. The recording sheet is stored in a sheet-feed cassette 146 mounted to the LBP 100. The sheet is fed to the electrostatic drum 144 by a sheet-feed roller 147, a carrying roller 148, and a carrying roller 149, and an image is formed on the sheet. The LBP body 100 is provided with at least one card slot (not shown) in order that an optional font card (to add optional fonts to built-in fonts) or a control card (emulation card) for a different language system (command system) can be connected.

Figures 2, 2A:
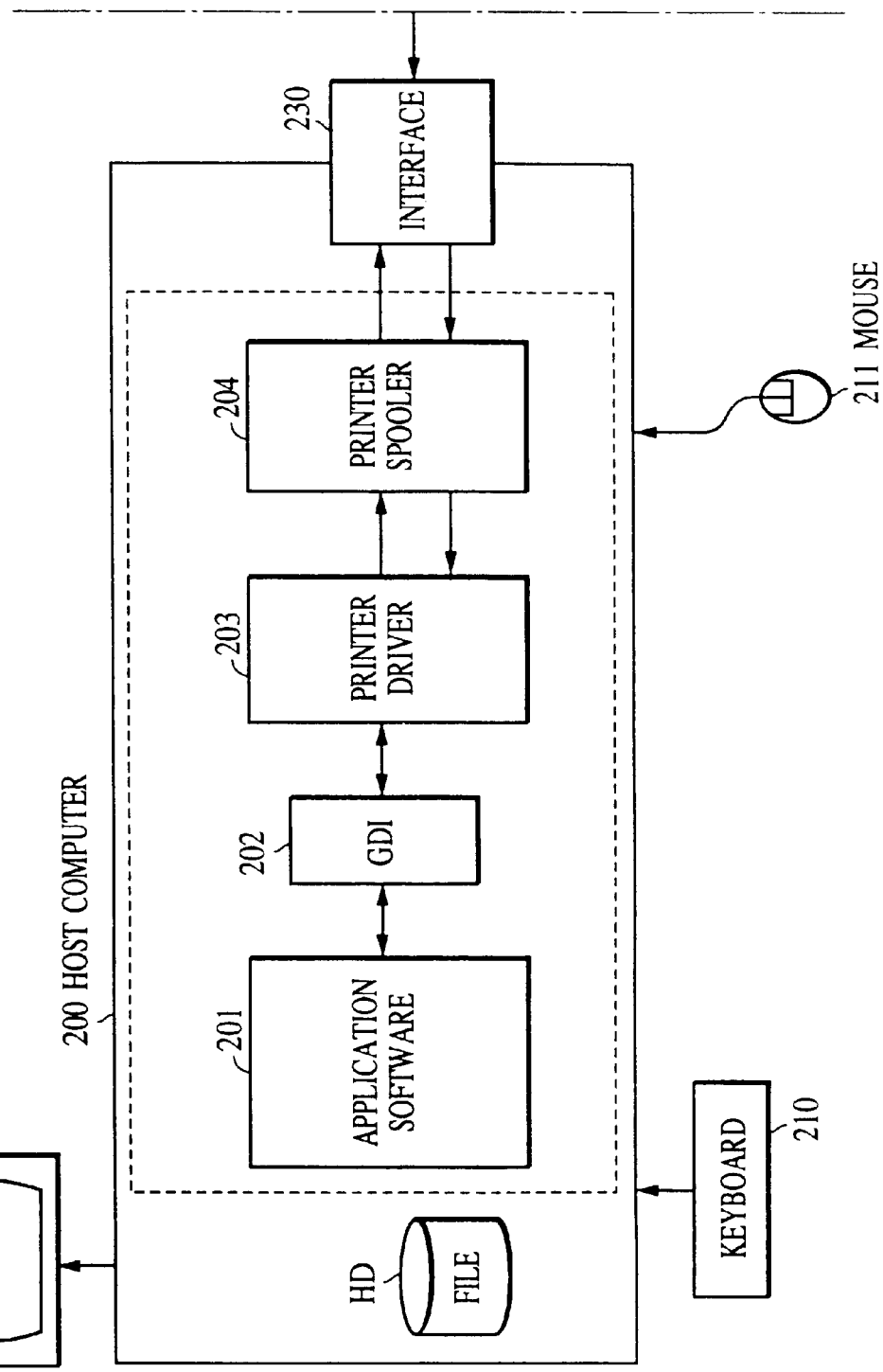
FIGS. 2A and 2B when taken together as shown in FIG. 2 form a block diagram of a printing system to which an information processing apparatus according to a first embodiment of the present invention can be applied.
Figure 2B:
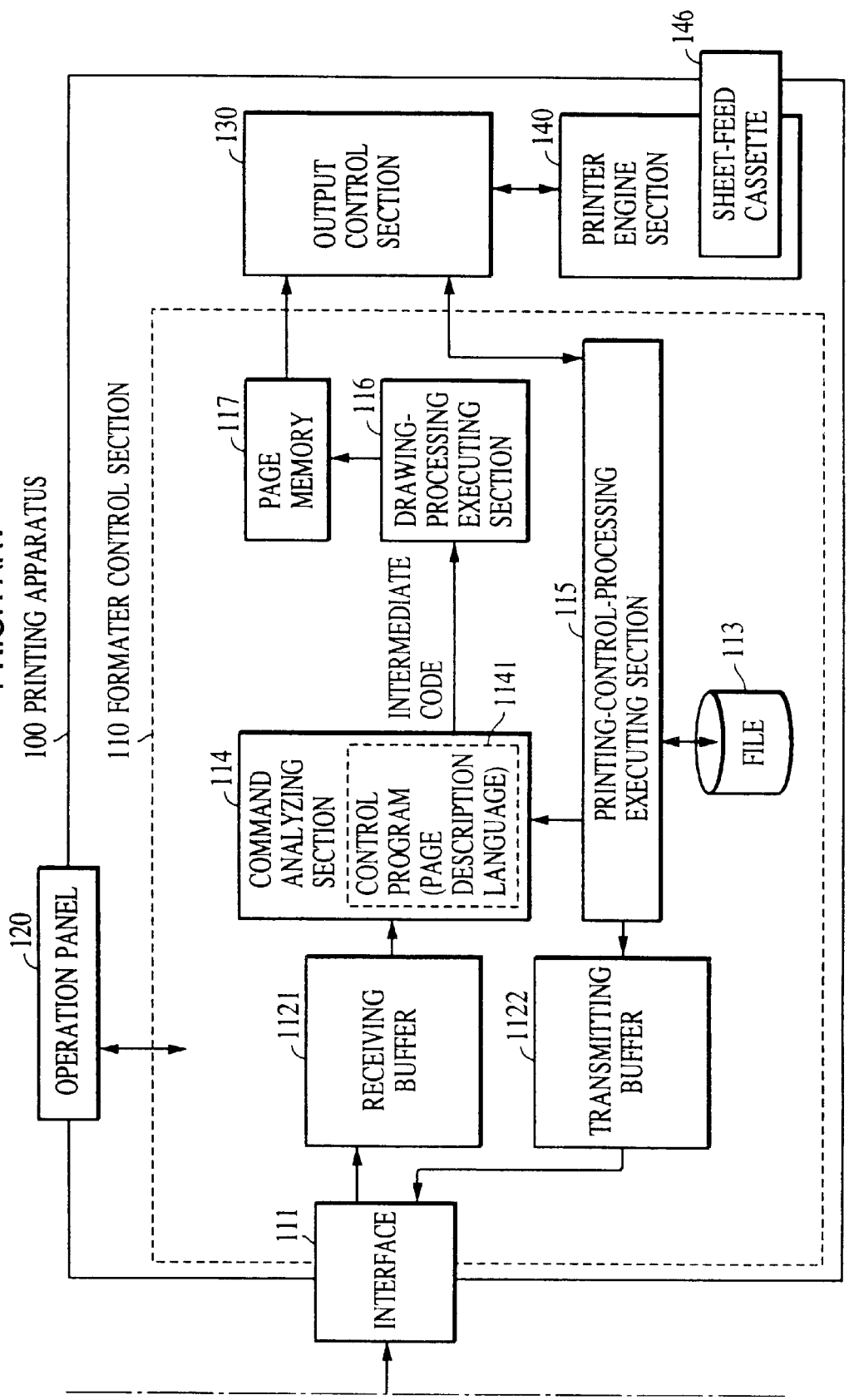

FIGS. 2A and 2B when taken together as shown in FIG. 2 form a block diagram of a printing system which can serve as an information processing apparatus according to a first embodiment of the present invention.

In FIGS. 2A and 2B, a host computer 200 outputs printing information formed of printing data and control codes to a printing apparatus 100. It is needless to say that the present invention can also be applied to a single unit, a system formed of a plurality of units, and a system in which processing is performed through a network such as a LAN when the function of the present invention is implemented.

The printing apparatus 100 includes, in terms of functions, a formatter control section 110, an operation-panel section 120, an output control section 130, and a printer engine section 140.

The formatter control section 110 includes an interface section 111 serving as communication means with the host computer 200, a receiving buffer 1121 for temporarily storing and controlling received data, a transmitting buffer 1122 for temporarily storing and controlling transmission data, a file system 113 serving as memory means for storing various data used in printing control processing, a command analyzing section 114 for analyzing printing data, a printing-control-processing executing section 115, a drawing-processing executing section 116 and a page memory 117.

The interface section 111 functions as communication means for transmitting and receiving printing data to and from the host computer 200 and for reporting the current state of the printing apparatus to which the present invention is applied. Printing data received through the interface section 111 is sequentially stored in the receiving buffer 1121, serving as memory means for temporarily storing the data, and, as required, read and processed by the command analyzing section 114.

The command analyzing section 114 has a control program 1141 conforming to each printing control command system (page description language). A command analyzed in the command analyzing section 114 converts the analysis result of printing data concerning character printing, figure drawing and image drawing into a standardized intermediate code which is more easy to process in the drawing-processing executing section 116. Commands other than those related to drawing, such as those for sheet selection and form entry, are processed in the printing-control-processing executing section 115.

The drawing-processing executing section 116 executes each drawing command by the use of the intermediate code and sequentially develops the object of each character, figure and image on the page memory 117. The formatter control section 110 is generally formed of a computer system which includes a central processing unit (CPU), a read-only memory (ROM) and a random access memory (RAM).

Processing in each section may be performed in a time-sharing manner under a multi-tasking monitor (real-time OS). Alternatively, a controller or hardware dedicated to each function may be prepared to independently perform the corresponding processing.

The operation panel 120 is used for setting and displaying various conditions of the printing apparatus.

The output control section 130 converts the contents of the page memory 117 to a video signal and transmits the video signal to the printer engine section 140. The printer engine section 140 serves as a printing mechanical section for forming a permanent visible image on a recording sheet from the received video signal, which was described before by referring to FIG. 1. The sheet-feed cassette 146 serves as a detachable sheet storing unit.

The printing apparatus 100 has been thus far described. The configuration of the host computer 200 is described next.

The host computer 200 functions as one computer system including a keyboard 210 serving as an input device, a mouse 211 serving as a pointing device and a display monitor 220 serving as a display device. The host computer 200 operates under basic software, such as MS-DOS or Windows 95.

Functions of the basic software related to printing are divided into an application software 201, a graphic device interface (hereinafter called GDI) 202, which is a function of the basic software, a printer driver 203 and a printer spooler 204 for temporarily storing data generated by the printer driver. In the present embodiment, it is assumed that the print processor, a software function, included in Windows 95and Windows NT is a part of the printer spooler 204.

In the host computer 200, software, generally called basic software, controls hardware such as a central processing unit (CPU), read-only memory (ROM) and random access memory (RAM), and application software operates under the basic software. The printer driver 203 and the printer spooler 204 are considered to be application software.

The application software 201 is, for example, word-processing software or spreadsheet software. General word-processing software is taken as an example and is described below.

Figure 3:
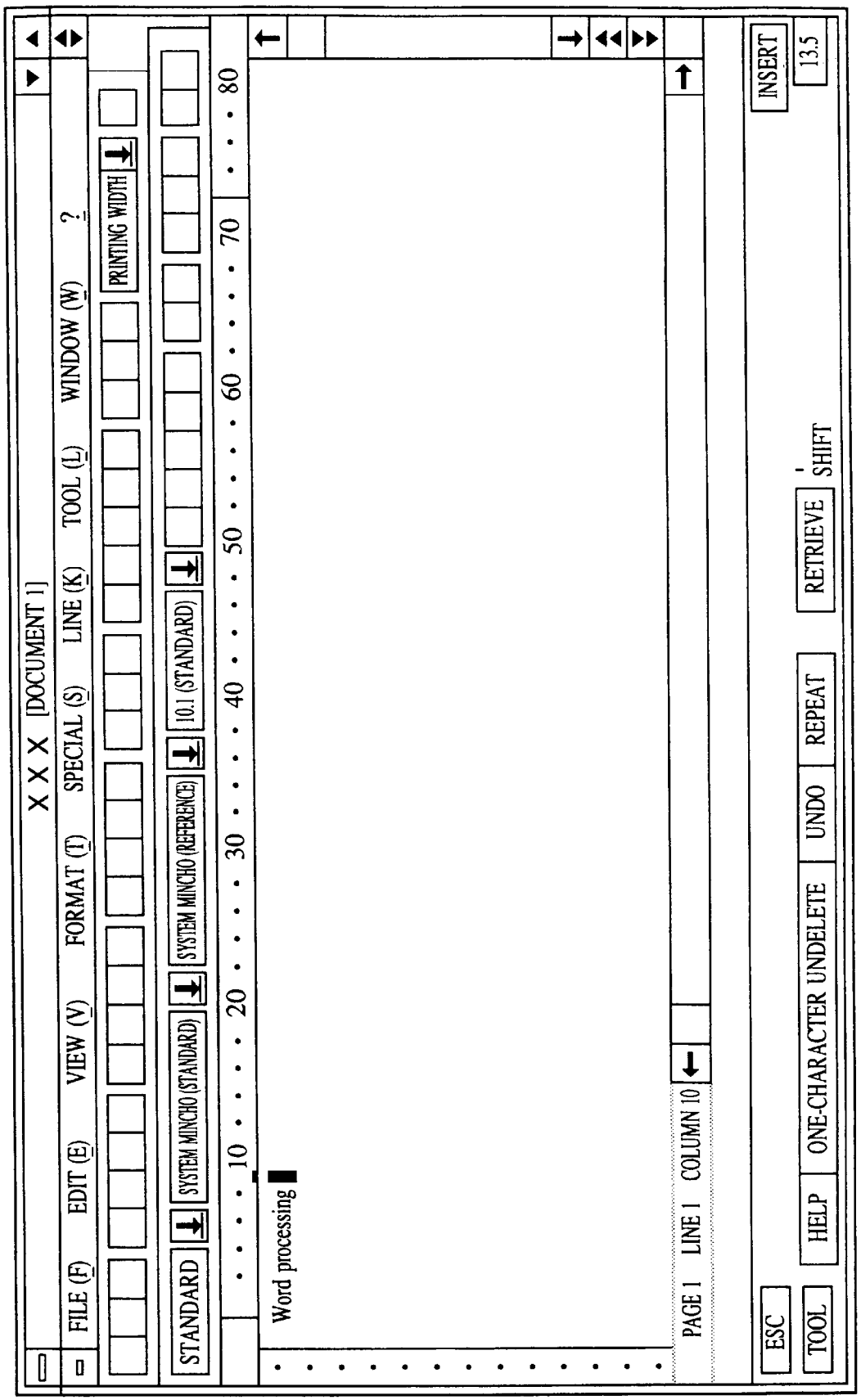
FIG. 3 is a view of an editing screen according to the application software 201 shown in FIG. 2.

The application software 201 provides a screen shown in FIG. 3 for mainly performing text editing. To print a document, a printing menu is selected with the use of the mouse 211 and printing is performed.

The application software 201 then calls the GDI 202, which is a function of the basic software. The GDI 202 is formed of a basic function group for controlling a display device and a printing device, such as that in a case for displaying data on the display monitor 220 and for printing. Various application software uses this basic function group to operate the hardware without being conscious of sections depending on the hardware model.

The GDI 202 receives information including the drawing capability of the printing device and printing resolution from the printer driver 203 for controlling information dependent on each printing apparatus, analyzes a GDI function which the application software 201 calls and sends the information to the currently selected printer driver 203.

The printer driver 203 generates a command string conforming to the command system corresponding to the printing apparatus and a data string, according to the information received from the GDI 202 and printing environment settings specified by the graphical user interface of the printer driver 203.

The generated command string and data string are temporarily stored in the printer spooler 204 serving as data storing means. The printer spooler 204 fast releases the printing processing of the application software. In other words, when printing data is directly sent to the printing apparatus, if the receiving buffer 1121 of the printing apparatus becomes full, or the communication means goes off line due to some reason such as paper jamming, the host computer cannot send the printing data and the printing processing of the application software is interrupted. With the use of means for temporarily storing data, the application software is released from the printing processing when the software sends all printing data to the storing means.

The command string and the data string temporarily stored in the printer spooler 204 are transmitted to the printing apparatus 100 through an interface section 230 serving as communication means in the host computer 200. The interface section 230 also has a function for receiving printing information from the printing apparatus.

The configuration has been described by referring to FIG. 2. The complete operation is briefly described next with a specific embodiment taken as an example.

An image sent from the printer driver in units of scanning lines is collectively handled according to the present invention, and the host computer adaptively rotates the image according to the direction in which a recording sheet is fed in the printer.

It is desirable in a page printer that the host computer 200 sends image data when the amount of the data reaches a certain level. Some application software does not send a data cluster but transmits very fractional image data. Fraction here refers, for example, to divided rectangle image data corresponding to one scanning line. If fractional image data is collectively handled at the host computer, the load of the printer for image drawing processing is reduced. When the direction in which image data is produced in the host computer differs by 90 or 270 degrees from the direction in which a recording sheet is fed in the printer, the printer performs rotation processing, and thereby a printing result is obtained slowly.

In the present invention, to solve the foregoing problems, fractional image data is stored by buffering, whether rotation is required is adaptively determined according to the direction in which a recording sheet is fed in the printer, rotation is performed at the host computer if necessary and data is sent to the printer.

The present invention is also characterized in that compensation is performed in buffering such that an image after buffering is a rectangle with rotation processing thereafter being taken into consideration.

Figure 4A:
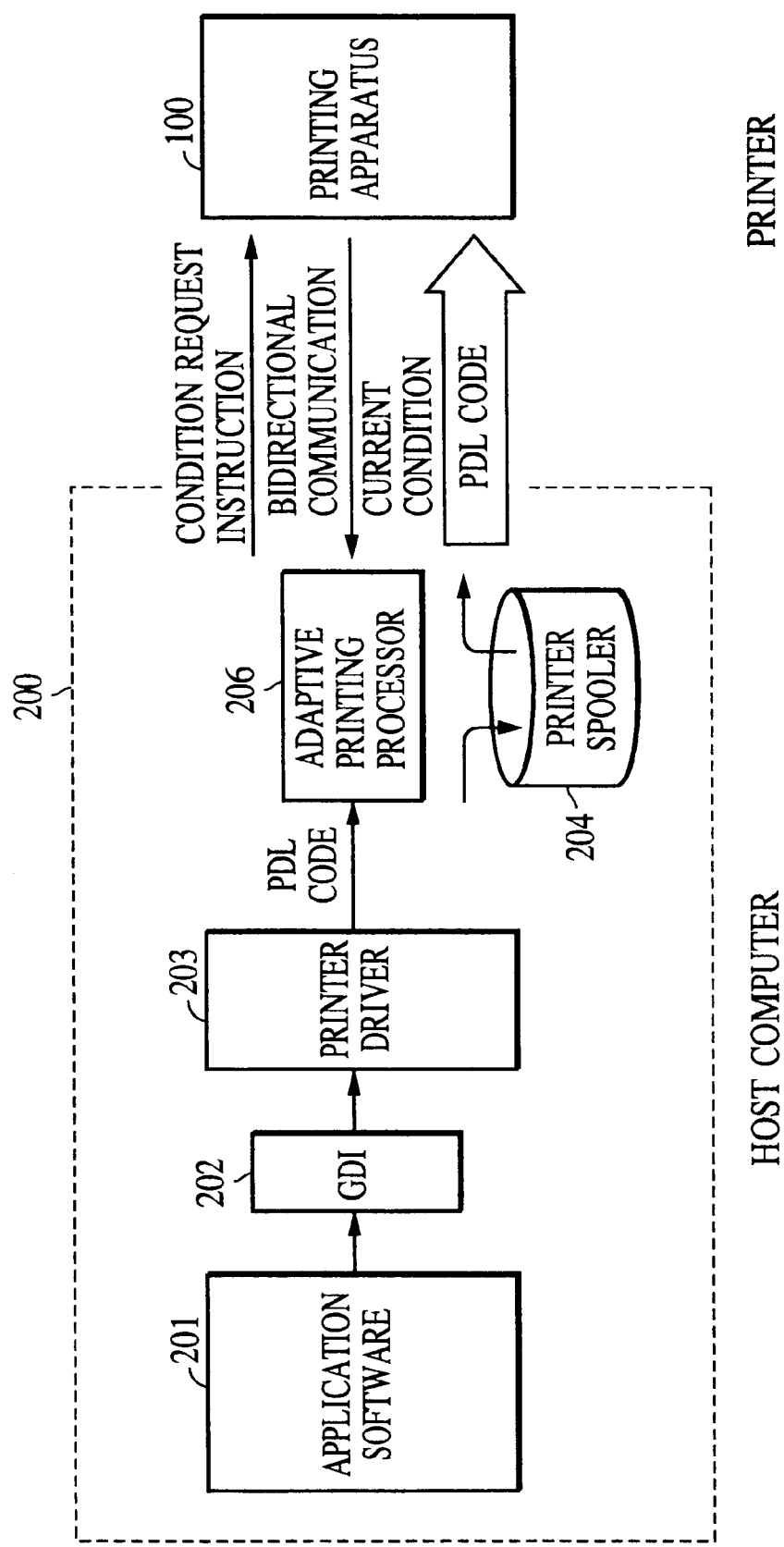
FIG. 4A is a block diagram of the flow of printing information processing in the host computer 200 of FIG. 2A.
Figure 4B:
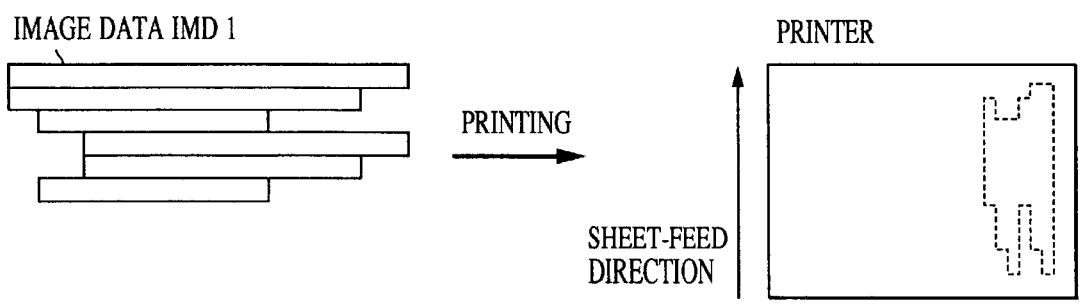
FIGS. 4B and 4C are diagrams showing the concept of image data structures in the host computer 200 of FIG. 2A.
Figure 4C:
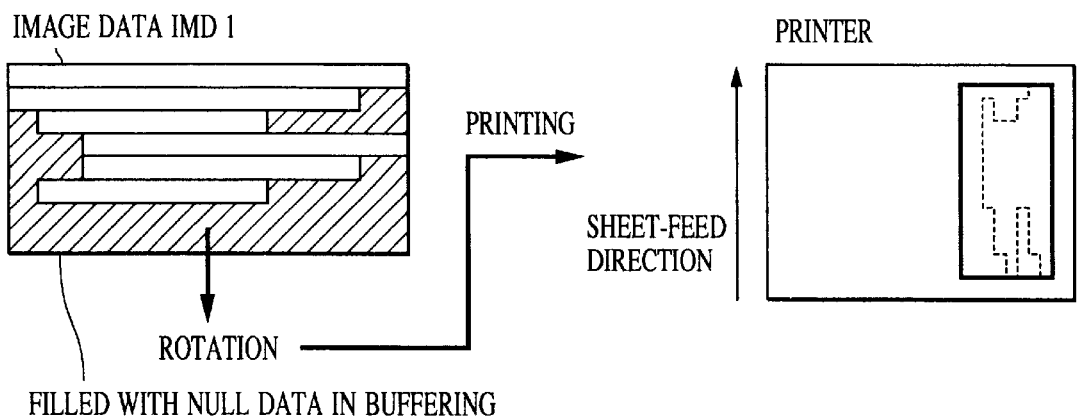

FIG. 4A shows the flow of printing information processing in the host computer 200 shown in FIG. 2 and FIGS. 4B and 4C show a concept of the structure of image data. The same numerals as those used in FIG. 1 are assigned to the same sections as those shown in FIG. 1. Software for performing processing according to the present invention in the present embodiment is hereinafter called an adaptive printing processor.

In FIG. 4A, an adaptive printing processor 206 stores fractional image data by buffering at the printer spooler 204, adaptively determines whether rotation is required according to the direction in which a recording sheet is fed in the printer, asks the host computer to perform rotation if necessary and sends data to the printer 100.

FIG. 4B and FIG. 4C show image-data structures. FIG. 4B corresponds to a conventional data structure. Even if image data IMD1 needs to be rotated according to a printing-format direction, the image data IMD1 developed according to a certain developing procedure is sent to the printer 100. The image data IMD1 is developed according to the printing format by a rotation resource in the printer 100 and is output from the printer engine.

FIG. 4C corresponds to a data structure according to the present invention. When image data IMD2 needs to be rotated according to a printing-format direction, the image data IMD2 (the host computer 200 assigns null data to hatched sections in the figure) developed according to a certain processing procedure and collectively processed is sent to the printer 100. The image data IMD2 is rotated, or sent to the printer 100, then developed according to the printing format by a rotation resource in the printer 100 and is output from the printer engine. Since the image data IMD2 is collectively processed, the processing load is substantially reduced as compared with conventional rotation processing in scanning units.

As described above, this printing system includes the printer spooler 204 serving as memory means for storing output information converted from output control information, the data processing function of the Adaptive Print Processor, which serves as re-converting means for re-converting the output information stored in the printer spooler 204, and the communication processing function of the Adaptive Print Processor 206, which serves as transmitting means for transmitting the output information converted by the data processing function to an external apparatus.

The printer is provided with current-condition reporting means for reporting the current condition of the printer, such as the capacity of a usable RAM area, an engine speed, a firmware version, and a sheet-feed direction, to the host computer, and the host computer is equipped with current printer condition reading means for reading the current condition of the printer, storage means for temporarily storing printing information data sent from the printer driver 203 before it is sent to the printing apparatus, data processing means for reading the printing information data from the storage means and for processing the printing information data according to information obtained by the current printer condition reading means, and transmitting means for transmitting the processed printing information data to the printing apparatus 100. Data processing is performed so as to generate printing information most suited to the printing apparatus 100 which receives data, by removing redundant portions from printing information formed of printing data and control codes which are generated by the printer driver 203. This processing solves problems such as the long time required for obtaining a printing result and the large data size obtained when printing information is stored in a file, these problems being caused by conventional printing information having a needlessly large data size and that having inefficient repeated processing. As a printing system including both the host computer and the printer, the printing efficiency is improved.

In other words, the present invention provides a filter which removes redundant portions from the original PDL data including redundant PDL codes which are generated by the printer driver 203. This filter actively generates a PDL code string adaptively optimized according to the conditions of the printer, such as the capacity of a usable RAM area, engine speed, a firmware version, and sheet-feed direction.

An object of the present invention is to improve the overall throughput of the printing system. The present invention may be applied to many cases in which processing at the printer is reduced by collectively processing fractional image data, performance is improved by eliminating an unnecessary data transfer path, a software bug in the printer driver is compensated for, and a software bug unique to the firmware of a specific version in the printer is compensated for.

Since information is basically processed by the host computer in the present invention, the total throughput for obtaining a printing result can be greatly increased according to the hardware performance (processing capability) of the host computer. It is expected that the advantages of the present invention will increase as the performance of personal computers and a network environment will obviously further improve in the future.

A first data processing operation of an information processing apparatus according to the present invention is described below by referring to FIGS. 5 to 7.

Figure 5:
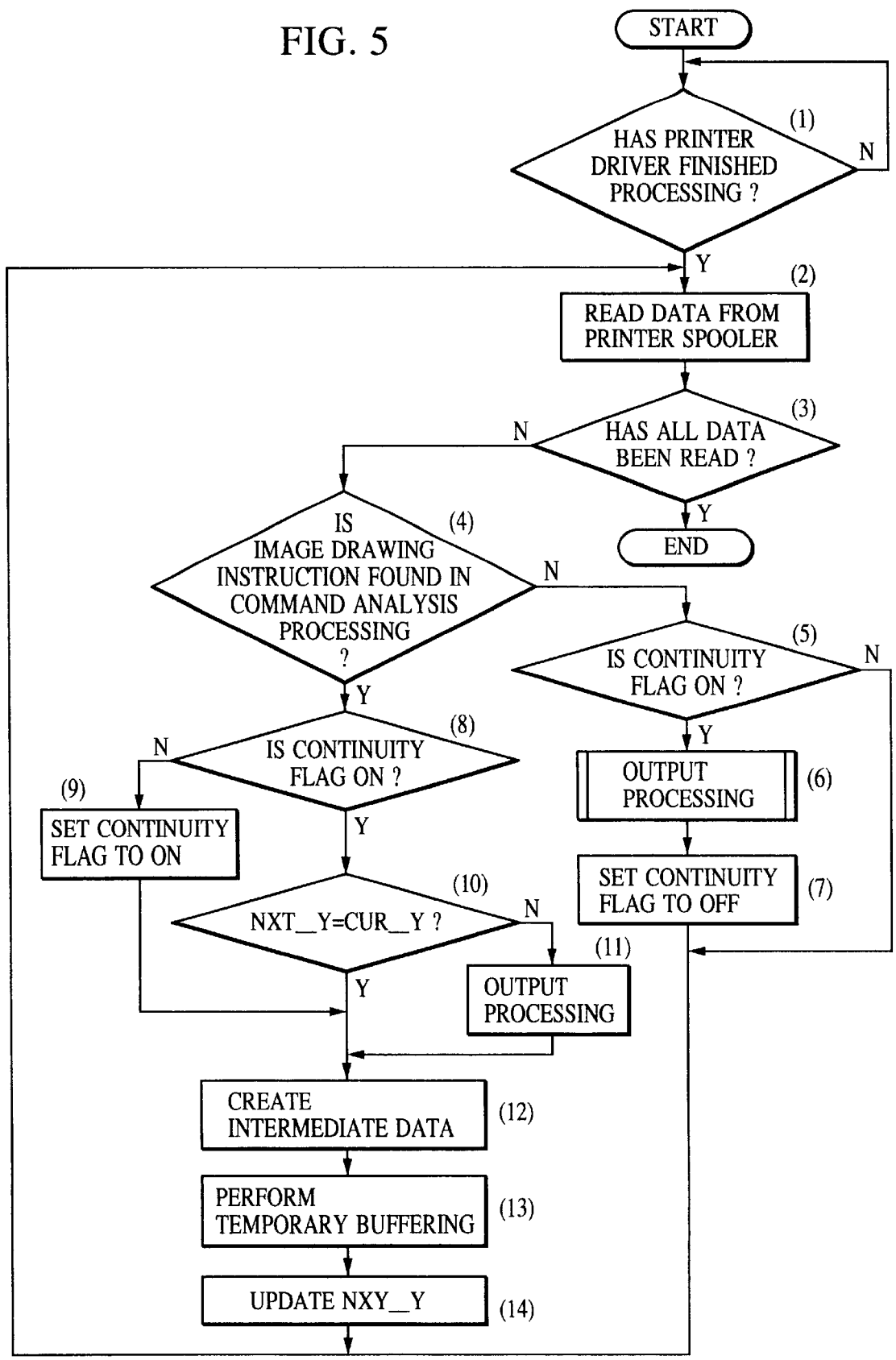
FIG. 5 is a flowchart of a first data processing procedure in the information processing apparatus according to the present invention.

FIG. 5 is a flowchart indicating a first data processing procedure for an information processing apparatus according to the present invention. The processing procedure corresponds to an embodiment form in which an image sent from the printer driver in units of scanning lines is collectively processed according to the present invention and the host computer adaptively rotates an image according to the direction in which a recording sheet is fed in the printer. Symbols (1) to (14) indicate the steps of the procedure.

This flowchart starts when the application software 201 has executed printing according to the printing menu and the printer driver 203 starts processing.

In step (1), whether the printer driver 203 has finished processing is determined. The printer driver 203 performs processing in units of series of data blocks which are called a printing job generated correspondingly to one printing operation on the application software 201.

The printer driver 203 temporarily stores a generated PDL code string into temporary storage means called a printer spooler 204. The printer spooler 204 helps to execute the printing processing of the application software and output processing to the printer separately, and as a result the application software is fast released from printing processing.

In step (2), after the series processing is completed, the adaptive printing processor 206 serving as software which performs processing according to the present invention is started and data is read from the printer spooler 204 by the software.

In step (3), whether all data has been read from the printer spooler 204 is determined. When it is determined that all data has been read, the processing is terminated. If not, the procedure proceeds to step (4) and the data is analyzed.

In step (4), the PDL code string generated by the printer driver 203 is searched for a series of command and data strings called a raster image drawing instruction. When it is determined that the read data does not include the instruction, the procedure proceeds to step (5).

When it is determined that the read data includes a raster image drawing instruction, the procedure proceeds to step (8) and a continuity flag is checked. In the present embodiment, the continuity flag is an internal flag used for determining whether buffering processing described later is continuously performed. When the continuity flag is on, the procedure proceeds to step (10) and a drawing position is calculated.

In buffering, whether a new image is to be continuously drawn after the image drawn immediately before is checked from the drawing position. Whether the maximum Y value plus a scanning line in the image drawn immediately before is equal to the starting position of the new image is checked. Since a buffered image needs to be compensated for in the X direction so as to be a rectangle, the positional relationship in the X direction at this point is ignored.

In step (10), a variable called $NXT_{13}$ Y which indicates the Y coordinate of the next drawing position is compared with a variable called $CUR_{13}$ Y which indicates the Y coordinate of the drawing start position in the currently-being-processed raster image drawing instruction to check continuity of drawing data. In this checking, when discontinuity is detected, buffering processing is terminated and data stored so far is output in step (11). The detailed output processing in step (11) is described later by referring to the flowchart shown in FIG. 6. This description will go back to step (8).

When it is determined in step (8) that the continuity flag is off, the procedure proceeds to step (9) and the continuity flag is set to on. Then the procedure proceeds to step (12). In step (12), the currently-being-processed PDL-format data, which is a raster image drawing instruction, is converted to internal intermediate data (details are noted later by referring to FIG. 8) shown in FIG. 7 so that it is convenient to rectangle processing to be performed later.

Figure 7:
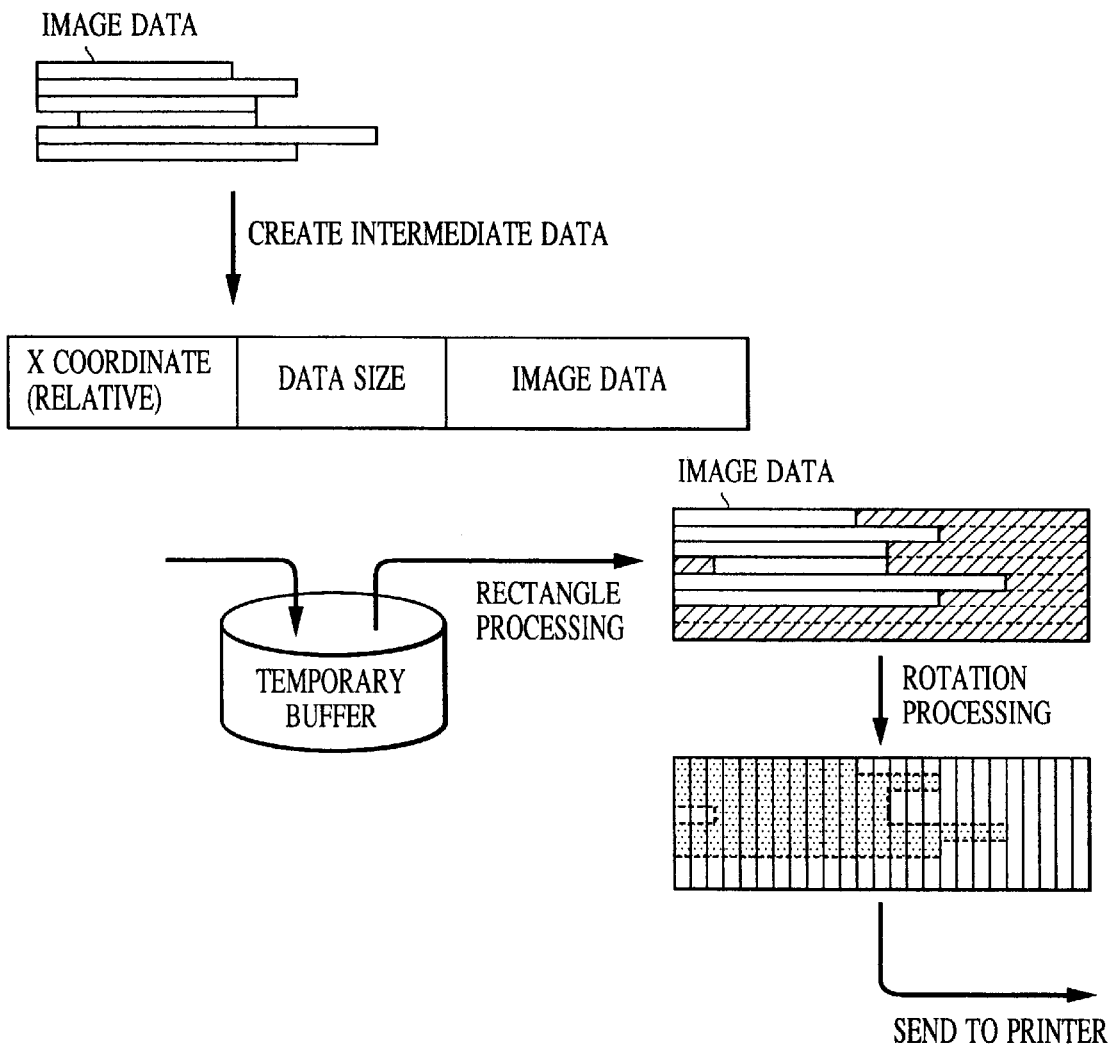
FIG. 7 is view showing a flow of data processing in an adaptive printing processor 206 shown in FIG. 4A.

In step (13), the intermediate data obtained in step (12) is temporarily buffered as shown in FIG. 7. Data temporarily stored is read afterwards and processed.

In step (14), a variable $NXT_{13}$ Y which indicates the Y coordinate of the drawing position for an image to be drawn next is updated. This processing is performed by adding the height (the number of scanning lines) of the image data being processed to the variable $CUR_{13}$ Y which indicates the Y coordinate of the drawing start position for the currently-being-processed raster image drawing instruction.

A case when an instruction other than a raster image drawing instruction is detected in command analysis processing in step (4) is described next.

The continuity flag is checked in step (5). When it is determined that the continuity flag is on, it is understood that the buffered image data is terminated by another printing instruction, and output processing described later is executed in step (6). Then, the continuity flag is set to off in step (7).

When it is determined in step (5) that the continuity flag is off, it is understood that buffering processing has not been performed, and steps (6) and (7) are skipped.

When a series of processing from step (4) to step (14) described above is finished, the procedure returns to step (2) and processes the next data.

The output processing in steps (6) and (11) in the flowchart shown in FIG. 5 are described in detail below.

Figure 6:
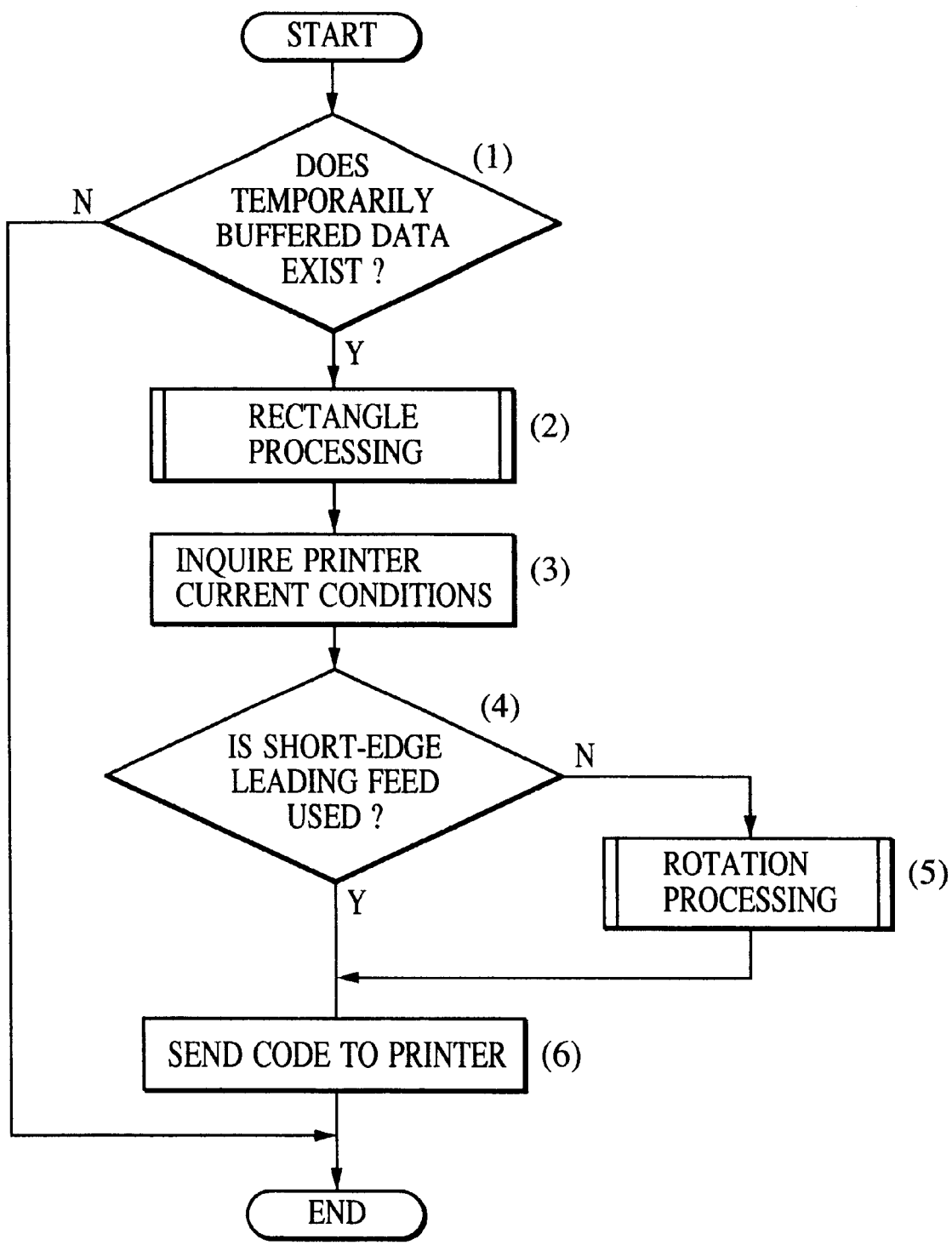
FIG. 6 is a flowchart of a detailed procedure of the output processing routine (6) shown in FIG. 5.

FIG. 6 is a flowchart of a detailed procedure of the output processing routine (6) shown in FIG. 5. Symbols (1) to (6) indicate the steps of the procedure.

FIG. 7 is a flowchart showing the flow of data processing performed by the adaptive printing processor 206 shown in FIG. 4.

In step (1) in FIG. 6, whether temporarily buffered data exists is determined. When it is determined that such data does not exist, the processing is terminated.

When it is determined in step (1) that the data exists, the processing proceeds to step (2) and rectangle processing is performed.

In the present embodiment, rectangle processing adds null data (zero) to fractional image data shown in FIG. 7, which has irregularities in width in the left and right direction, to produce image data having a rectangular shape as a whole. One raster image drawing instruction can be used for image data having a rectangular shape, otherwise a plurality of PDL raster image drawing instructions are issued. The instructions are repeated, redundant command parameters such as resolution and an X coordinate are substantially reduced, and loads for command analysis in the printer and image drawing processing are also reduced.

When rotation processing is also required, it is more efficient to handle rectangular image data than image data having irregularities as shown in FIG. 7 and image data sent by one scanning line. This is because rotation processing can be performed by special rotation processing hardware in units of squares 64 by 64 or 128 by 128. Performance is also improved as compared with rotation processing in which data of several lines is sequentially rotated.

Actual rectangle processing is performed as follows while intermediate data generated in steps (12) and (13) in the flowchart shown in FIG. 5 is sequentially read from the temporary buffer.

All intermediate data is scanned once, and the maximum width (Wmax) and the X coordinate (Xmin) of the leftmost point of image data are searched for. The intermediate data is scanned from the beginning once again, and the X coordinate of the leftmost point of each image data is compared with Xmin and a difference is filled with null data at the top of actual data (real image data). In addition, null data is interpolated at the end of each actual data such that each image data has the same width as Wmax. Such interpolation processing with the use of null data is sequentially performed for all intermediate data to create image data having a rectangular shape as a whole.

The flowchart shown in FIG. 6 is again described.

After the rectangle processing is finished, in step (2), whether a recording sheet is currently fed with a long-edge leading or a short-edge leading is inquired of the current-condition reporting means for reporting the current conditions of the printer, such as the capacity of a usable RAM area and a sheet-feed direction, to the host computer.

The current-condition reporting means exists as one program in the printing-control-processing executing section 115 of the printing apparatus 100. The reporting means monitors various conditions of the printing apparatus 100, converts the results to a certain-format data string, and sends it to the transmitting buffer 1122. The data string sent to the transmitting buffer 1122 is transmitted to the host computer through the interface section 111.

The host computer 200 obtains information of the printing apparatus 100. Communication between the host computer 200 and the printing apparatus 100 is performed through the bidirectional communication means in the form of information inquiry and current-information reply.

In step (3), whether the sheet-feed cassette mounted in the printing apparatus 100 is set for long-edge leading feed or short-edge leading feed is inquired in the above method.

A sheet-feed direction refers to a direction in which a rectangular A4 sheet, for example, is fed. It can be a direction in which a long edge is fed or a direction in which a short edge is fed. In a printing apparatus in which long-edge leading feed is allowed, a higher throughput is obtained in long-edge leading feed than in short-edge leading feed due to a shorter sheet-carrying time.

In long-edge leading feed, however, a photosensitive drum having a width equal to the length of an A4 sheet is required in the transfer and fixing processes in electrophotography. Furthermore, in some cases, a sheet needs to be fed in the short-edge leading manner for expansion and reduction.

From the foregoing reasons, two manners of feed, long-edge leading feed and short-edge leading feed, are used. In general, although page description is performed in PDL without depending on the sheet-feed direction, actual drawing processing largely depends on the direction and the processing greatly differs.

The direction of image data sent from the host computer may differ from a direction used in drawing processing in the printing apparatus by 90 or 270 degrees. Rotation processing required is usually performed in the printing apparatus, but the throughput thereof may be reduced due to the rotation processing.

The present invention also solves this problem. Sheet-feed information obtained from the printing apparatus 100 is checked in step (4). When a sheet is fed in the long-edge leading manner, the host computer performs rotation processing in advance in step (5).

When it is determined in step (4) that a sheet is fed in the short-edge leading manner, since the image data created by the printer driver 203 can be used as is with the specified direction, the rotation processing is not performed and the processing proceeds to step (6).

The rotation processing in step (5) reads the rectangular real image data in basic units of squares 128 pixels by 128 pixels, and applies rotation so as to match the sheet-feed direction. When the most suited image data which does not require rotation processing at the printer is completed, the data is transmitted to the printer in step (6), and all processing is finished.

As described above, in the present embodiment, the printer is provided with the current-condition reporting means for reporting the current condition of the printer, such as the capacity of a usable RAM area, and a sheet-feed direction, to the host computer, and the host computer is equipped with the means for reading the current condition of the printer, the storage means for temporarily storing printing data sent from the printer driver 203, the means for reading the printing data from the storage means and for processing the printing data according to the current printer condition, and the transmitting means for transmitting the processed printing data to the printing apparatus 100. The data processing means removes redundant portions, which is a load for the printer, to provide the most suited printing data.

Figure 8:
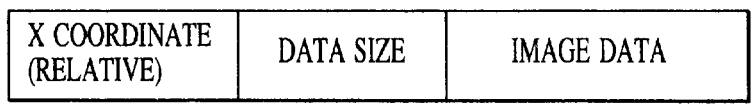
FIG. 8 is a view showing an intermediate data format in the printing apparatus 100 shown in FIG. 2B.

FIG. 8 is a view showing an intermediate data format in the printing apparatus 100 shown in FIG. 2.

In the present embodiment, intermediate data is formed of an X coordinate (relative), a data size, and image data.

The contents of a hard disk serving as a memory resource of the host computer 200 in the present embodiment is described next by referring to FIG. 9.

Figure 9:
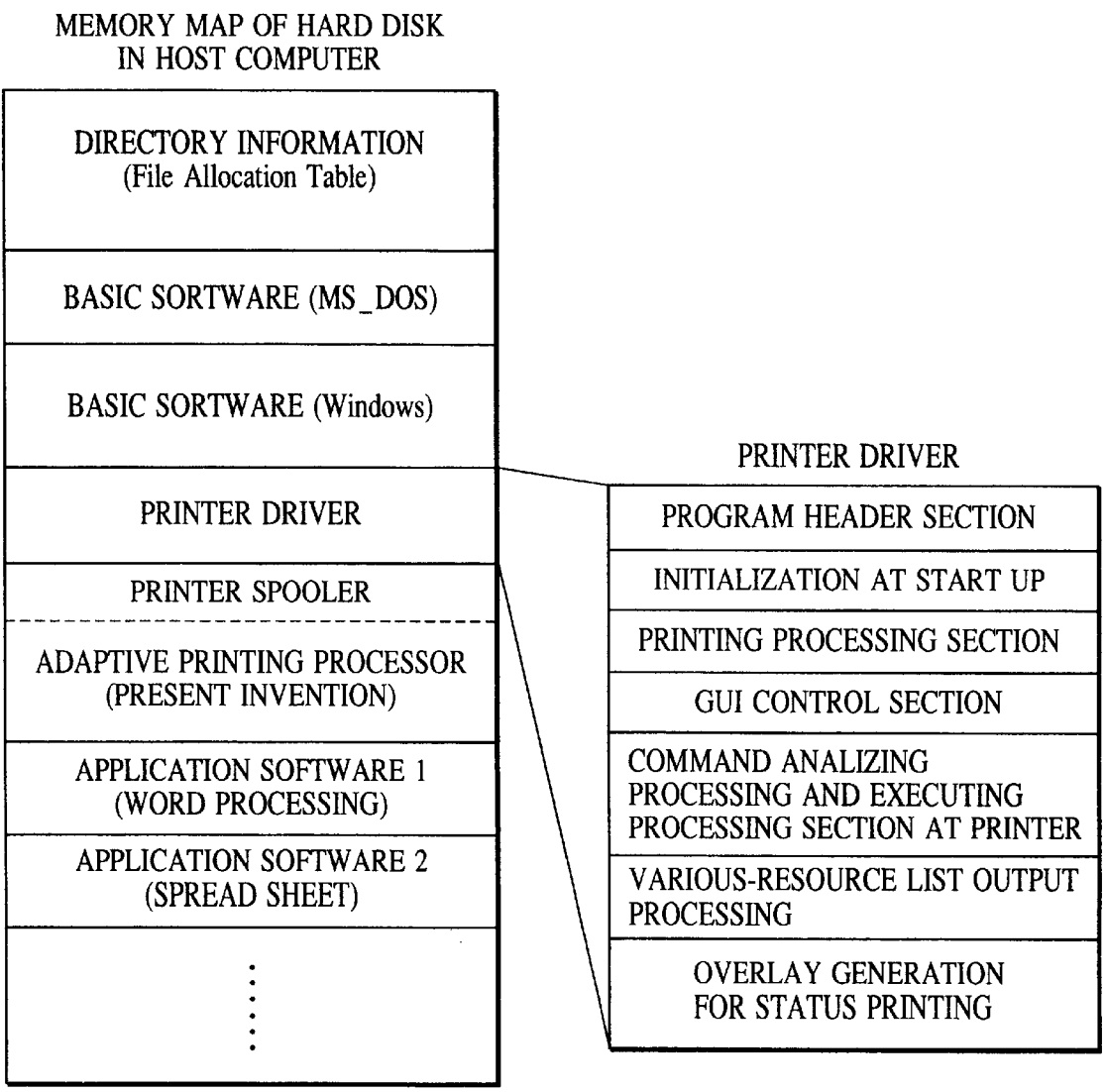
FIG. 9 is a memory map of the hard disk HD shown in FIG. 2A.

FIG. 9 shows a memory map of the hard disk HD shown in FIG. 2.

In FIG. 9, directory information includes the physical position where each program is stored. A basic software controls the execution of application software and intervenes in data transfer between the host computer 200 and a peripheral unit. The printer driver 203 is supplied to the hard disk of the host computer from a recording medium such as a floppy disk. The adaptive printing processor 206 to which the present invention is applied and the printing spooler 204 are also supplied in the same way. The hard disk also includes a plurality of application software which the user actually uses for work.

As described above, an information processing method according to the present invention includes step (11) shown in FIG. 5, which serves as a re-converting step for re-converting the output information converted from the output control information, and step (6) shown in FIG. 6, which serves as a transmitting step for transmitting the re-converted output information to the external apparatus. The adaptive printing processor 206 executes a control program stored in a recording medium (not shown) to perform the processing in these steps. Therefore, the output information which is difficult to process by the external apparatus when it is converted from the output control information is re-converted to another output information to be easily processed by the external apparatus, and processing efficiency in the external apparatus which processes the transmitted output information is greatly improved.

A recognition step for recognizing the condition of the external apparatus corresponds to steps (3) and (4) shown in FIG. 6.

The present invention also includes a case in which the program codes corresponding to the steps shown in FIGS. 5 and 6 are stored in an external recording medium described later or an internal storage resource and the CPU (not shown) reads the program codes from the recording medium and executes them.

Figure 11A:
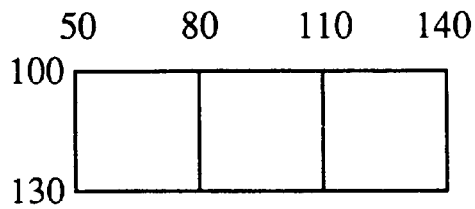
FIGS. 11A and 11B are views of drawn objects when drawing a rectangle in a printing system.
Figure 11B:
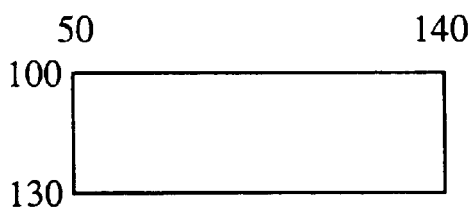

In the above embodiment, fractional image data is collectively handled and rotation processing is performed, if necessary, according to a sheet-feed direction in the printer in order to in advance reduce a potential load of the printer caused by printing data to improve performance. The present invention can also be applied to all PDL codes including drawn objects (rectangle drawing in FIG. 11) other than an image, as shown in FIG. 11.

In the above embodiment, the processing (the adaptive printing processor) of the present invention is started when the printer driver finishes processing a printing job. The processing according to the present invention can be also executed in parallel to the processing of the printer driver. Such parallel processing depends on the functions of the basic software, OS. In Windows 95, for example, complete multi-tasking is allowed.

In the above embodiment, the current condition of the printing apparatus is detected at every printing job. The current condition can be monitored at every page. When such a change is made, if A4 sheets disposed at the long-edge leading feed tray have been used up and A4 sheets disposed at the short-edge leading feed tray are selected in automatic sheet-feed mode, the processing can handle this situation dynamically.

A configuration of a data processing program which can be read by a printing system to which an information processing apparatus according to the present invention is applied is described below by referring to a memory map shown in FIG. 10.

FIG. 10 is a memory map of a recording medium in which various data processing programs are stored which can be read by a printing system to which an information processing apparatus according to the present invention is applied.

Although not shown in the figure, information for controlling program groups stored in a recording medium, such as the version information and creators of each program, and information depending on the OS of the computer which reads programs, such as an icon which identifies and indicates a certain program, may also be stored.

The directory also controls data for each program. A program for installing various programs in the computer and a program for expanding a compressed program to be installed may also be stored.

The functions shown in FIGS. 5 and 6 in the present embodiment may be performed by the host computer with the corresponding programs externally installed. In this case, the present invention is also applied even when an information group including a program is supplied from a recording medium such as CD-ROM, flash memory, and a floppy disk, or from an external recording medium through a network to an output apparatus.

It is needless to say that the object of the present invention is also achieved when a recording medium in which the program codes of software which implements the functions described above in the embodiment are stored is supplied to the system or the apparatus, and the computer (CPU or MPU) of the system or the apparatus reads and executes the program codes stored in the recording medium.

In this case, the program codes themselves read from the recording medium achieve the new functions of the present invention. Therefore, the recording medium storing the program codes are part of the present invention.

The recording medium for supplying the program codes may be a floppy disk, a hard disk, an optical disk, a magneto-optical disk, a CD-ROM, a CD-R, a magnetic tape, a nonvolatile memory card, a ROM, and an EEPROM.

The present invention includes a case in which the functions of the above embodiment are achieved through the execution of the program codes which the computer reads, and also includes a case in which according to a direction of the program codes the operating system running on the computer performs a whole or a part of actual processing and the functions of the above embodiment are achieved by the processing.

It is needless to say that the present invention also includes a case in which program codes read from a recording medium are written into memory provided for a function extension board inserted into the computer or a function extension unit connected to the computer, the CPU provided for the function extension board or the function extension unit performs a whole or a part of the actual processing according to a direction of the program codes, and the functions of the above embodiment are achieved by the processing.

Since the adaptive printing processor is disposed at the host computer between the printer driver and the printing apparatus and in advance reduces a potential load which printing data generated by the printer driver causes, in response to the output environmental condition of the printing apparatus, the total time required for printing in the printing system from when the user issues a printing start direction at the host computer to when a printing result is obtained is substantially reduced. This means printing performance is greatly improved.

Specifically, printing speed is increased due to deletion of redundant printing data and reduced printing data, and storage memory area is saved. Rotation processing is performed at a higher speed because image data is collectively handled by buffering processing and the total printing processing speed is increased.

In addition, a redundant code string is reduced such as that including repeated simple drawing instructions caused depending on a drawing procedure an application software takes. This means the efficiency of repeating processing is improved.

This improved efficiency contributes to reduction of an internal processing load as well as reduces the amount of data transfer. The higher the processing capacity of the CPU in the information processing apparatus is, the more the total throughput is improved.

Since the re-processing means is disposed at the host computer between the printer driver and the printing apparatus, it can be used without changing the conventional printing system.

Since the processing of the present invention can serve as a simple filter program which receives a PDL code and transmits a PDL code, the host computer depends on the environment at an extremely low level in terms of its model and can operate in various environments.

Especially in a network environment, when the processing is built as a filter program in the computer serving as a printer server, printing requests from a plurality of users are further handled efficiently.

What is claimed is:

1. An information processing apparatus for transmitting printing information to an external apparatus comprising:

first converting means for converting first printing information to second printing information; and second converting means for converting the second printing information to third printing information wherein the second converting means collects a plurality of divided image data each of which is indicated by a different instruction in the second printing information to produce one image data and generates an instruction indicating the one image data in the third printing information.

2. An information processing apparatus according to claim 1, wherein the first printing information is generated through the execution of an application program in said information processing apparatus.

3. An information processing apparatus according to claim 1, wherein the external apparatus is a printing apparatus and the third printing information is printing data for analysis by the printing apparatus.

4. An information processing apparatus according to claim 1, wherein the second printing information is printing data for analysis by said external apparatus.

5. An information processing apparatus according to claim 1, wherein said second converting means forms the third printing information according to page description language.

6. An information processing apparatus according to claim 1, wherein said second converting means arranges a plurality of raster image instructions into one raster image instruction.

7. An information processing apparatus according to claim 1, wherein said second converting means converts the second printing information to the third printing information wherein the third printing information specifies a different sheet-feed direction from the second printing information.

8. An information processing apparatus according to claim 1, further comprising obtaining means for obtaining information of the external apparatus from the external apparatus,
wherein said second converting means converts the second printing information to the third printing information according to the information obtained from the external apparatus.

9. An information processing apparatus according to claim 1, wherein said second converting means converts a plurality of image data in each scanning line to one image data.

10. An information processing apparatus according to claim 1, further comprising transmitting means for transmitting the third printing information to the external apparatus.

11. An information processing method of operating an information processing apparatus for transmitting printing information to an external apparatus comprising the steps of:
converting first printing information to second printing information using first converting means; and
converting the second printing information to third printing information using a second converting means wherein the second converting means collects a plurality of divided image data each of which is indicated by a different instruction in the second printing information to produce one image data and generates an instruction indicating the one image data in the third printing information.

12. An information processing method according to claim 11, wherein the first printing information is generated through the execution of an application program in an information processing apparatus.

13. An information processing method according to claim 11, wherein the external apparatus is a printing apparatus and the third printing information is printing data for analysis by the printing apparatus.

14. An information processing method according to claim 11, wherein the second printing information is printing data for analysis by said external apparatus.

15. An information processing method according to claim 11, wherein said second converting step forms the third printing information according to a page description language.

16. An information processing method according to claim 11, wherein said converting step arranges a plurality of raster image instructions into one raster image instruction.

17. An information processing method according to claim 11, wherein converting step converts the second printing information to the third printing information wherein the third printing information specifies a different sheet-feed direction from the second printing information.

18. An information processing method according to claim 11, further comprising a step of obtaining information of the external apparatus from the external apparatus, wherein said second converting step converts the second printing information to the third printing information according to the information obtained from the external apparatus.

19. An information processing method according to claim 11, wherein said second converting step converts a plurality of image data in each scanning line to one image data.

20. An information processing method according to claim 11, further comprising a step of transmitting the third printing information to the external apparatus.

21. A recording medium readable by a computer in which a program is stored, the program for transmitting printing information from an information processing apparatus to an external apparatus comprising the steps of:
converting first printing information to second printing information using first converting means; and
converting the second printing information to third printing information using a second converting means wherein the second converting means collects a plurality of divided image data each of which is indicated by a different instruction in the second printing information to produce the image data and generates an instruction indicating said one image data in the third printing information.

22. A recording medium according to claim 21, wherein the first printing information is generated through execution of an application program in said information processing apparatus.

23. A recording medium according to claim 21, wherein said external apparatus is a printing apparatus and the third printing information is printing data for analysis by said external apparatus.

24. A recording medium according to claim 21, wherein the second printing information is printing data for analysis by said external apparatus.

25. A recording medium according to claim 21, wherein said second converting step forms the third printing information according to a page description language.

26. A recording medium according to claim 21, wherein said converting step arranges a plurality of raster image instructions into one raster image instruction.

27. A recording medium according to claim 21, wherein converting step converts the second printing information to the third printing information wherein the third printing information specifies different sheet feed direction from the second printing information.

28. A recording medium according to claim 21, the program further comprising a step of obtaining information of the external apparatus from the external apparatus,
wherein said second converting step converts the second printing information to the third printing information according to the information obtained from the external apparatus.

29. A recording medium according to claim 21, wherein said second converting step converts a plurality of image data in each scanning line to one image data.

30. A recording medium according to claim 21, the program further comprising a step of transmitting the third printing information to the external apparatus.

31. An information processing apparatus according to claim 1, further comprising, obtaining means for obtaining capability information of the information processing apparatus from the information processing apparatus, wherein said second converting means converts the second printing information to third printing information adjusted to the capability information obtained from the printing information.

32. An information processing apparatus according to claim 1, wherein said second converting means adds null data to each of the plurality of divided image data to produce one image data having a rectangular shape.

33. An information processing apparatus according to claim 31, wherein said obtaining means obtains the capability information about a sheet-feed direction and said second converting means converts the second printing information to the third printing information specifies a different sheet-feed direction from the second printing information.

34. An information processing method according to claim 11, further comprising obtaining capability information of the information processing apparatus from the information processing apparatus, wherein said second converting means converts the second printing information to third printing information adjusted to the capability information obtained from the printing information.

35. An information processing method according to claim 11, wherein said second converting step adds null data to each of the plurality of divided image data to produce one image data having a rectangular shape.

36. An information processing method according to claim 34, wherein said obtaining step obtains the capability information about a sheet-feed direction and said second converting step converts the second printing information to the third printing information specifies a different sheet-feed direction from the second printing information.

37. A recording medium readable according to claim 21, further comprising, obtaining means for obtaining capability information of the information processing apparatus from the information processing apparatus, wherein said second converting means converts the second printing information to third printing information adjusted to the capability information obtained from the printing information.

38. A recording medium according to claim 21, wherein said second converting step adds null data to each of the plurality of divided image data to produce one image data having a rectangular shape.

39. A recording medium according to claim 37, wherein said obtaining means obtains the capability information about a sheet-feed direction and said second converting means converts the second printing information to the third printing information specifies a different sheet-feed direction from the second printing information.

* * * * *

UNITED STATES PATENT AND TRADEMARK OFFICE
CERTIFICATE OF CORRECTION

PATENT NO.    : 6,320,667 B1
DATED         : November 20, 2001
INVENTOR(S)   : Shunya Mitsuhashi It is certified that error appears in the above-identified patent and that said Letters Patent is hereby corrected as shown below:

Column 11,
Line 23, "FIG. 4B and FIG. 4C" should read -- FIGS. 4B and 4C --.

Column 13,
Line 29, "$NXT_{13}$ Y" should read -- NXT_Y --;
Line 31, "$CUR_{13}$ Y" should read -- CUR_Y --;
Line 51, "$NXT_{13}$ Y" should read -- NXT_Y --; and
Line 55, "$CUR_{13}$ Y" should read -- CUR_Y --.

Column 21,
Line 9, "information" should read -- information wherein the third printing information --.

Column 22,
Line 3, "information" should read -- information wherein the third printing information --; and
Line 20, "information" should read -- information wherein the third printing information --.

Signed and Sealed this

Thirtieth Day of April, 2002

Attest:

*Attesting Officer*

JAMES E. ROGAN
*Director of the United States Patent and Trademark Office*